United States Patent [19]

Buhler

[11] Patent Number: 5,569,751
[45] Date of Patent: Oct. 29, 1996

[54] MONOAZO DYESTUFFS WHICH ARE FREE FROM IONIC GROUPS, THEIR PREPARATION AND THEIR USE

[75] Inventor: Ulrich Buhler, Alzenau, Germany

[73] Assignee: Hoechst Mitsubishi Kasei Co., Japan

[21] Appl. No.: 447,540

[22] Filed: May 24, 1995

[30] Foreign Application Priority Data

Jun. 3, 1994 [DE] Germany .................... 44 19 622.9

[51] Int. Cl.$^6$ .................... C09B 29/01; C09B 29/085; C09B 39/00; D06P 1/18

[52] U.S. Cl. .................... 534/850; 534/854; 534/855; 534/859; 8/532; 8/639; 8/922

[58] Field of Search .................... 534/850, 854, 534/855, 859; 8/532, 639, 922

[56] References Cited

U.S. PATENT DOCUMENTS

| Re. 33,908 | 5/1992 | Tappe et al. | 8/639 |
|---|---|---|---|
| 933,841 | 9/1909 | Jansen et al. | 534/859 |
| 4,249,902 | 2/1981 | Kruckenberg et al. | 8/525 |
| 4,420,308 | 12/1983 | Bühler et al. | 8/464 |
| 4,678,476 | 7/1987 | Tappe et al. | 8/639 |

FOREIGN PATENT DOCUMENTS

| 0073876 | 3/1983 | European Pat. Off. |
| 0222255 | 5/1987 | European Pat. Off. |
| 2393036 | 12/1978 | France . |
| 2073230 | 10/1981 | United Kingdom . |

OTHER PUBLICATIONS

Journal fur Praktische Chemie, Chemiker Zeitung, vol. 335, No. 6, Jun. 1993, *Arylazostilbene und tolane durch Heck-–Reaction.*

*Primary Examiner*—Fiona T. Powers
*Attorney, Agent, or Firm*—Connolly & Hutz

[57] ABSTRACT

The present invention relates to new useful azo dyestuffs which are free from ionic groups, of the general formula I

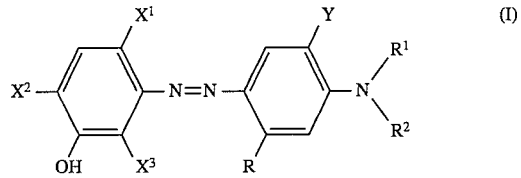

wherein $X^1$, $X^2$, $X^3$, Y, R, $R^1$ and $R^2$ have the meanings given in Claim 1, mixtures of dyestuffs of the general formula I, the preparation of dyestuffs of the general formula I and their use for dyeing and printing hydrophobic fibre materials.

19 Claims, No Drawings

MONOAZO DYESTUFFS WHICH ARE FREE FROM IONIC GROUPS, THEIR PREPARATION AND THEIR USE

The present invention relates to new useful azo dyestuffs which are free from ionic groups, of the general formula I

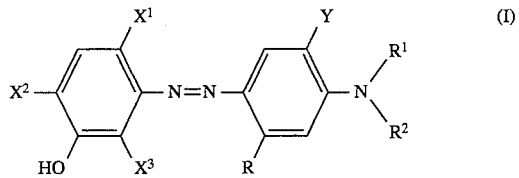

in which $X^1$ and $X^2$ independently of one another are nitro, bromine, chlorine or hydrogen, $X^3$ is hydrogen, chlorine or bromine, R is hydrogen, hydroxyl, chlorine, methyl, methoxy, ethoxy, $(C_1-C_4)$-alkylcarbonylamino, $(C_1-C_4)$-alkylsulphonylamino, $(C_1-C_4)$-alkoxycarbonylamino, $(C_1-C_4)$-alkylcarbonylamino which is substituted by hydroxyl, $(C_1-C_4)$-alkoxy, chlorine, bromine, cyano, phenyl or phenoxy, $(C_1-C_4)$-alkylsulphonylamino or $(C_1-C_4)$-alkoxycarbonylamino which are substituted by hydroxyl, $(C_1-C_4)$-alkoxy, chlorine, bromine or cyano, or hydroxyl, Y is hydrogen, chlorine, methoxy, ethoxy, methoxyethoxy or ethoxyethoxy and $R^1$ and $R^2$ independently of one another are $(C_1-C_4)$-alkyl; $(C_1-C_4)$-alkyl which is substituted by hydroxyl, $(C_1-C_4)$-alkoxy, alkoxyalkoxy having a total of up to 6 C atoms, hydroxyalkoxy having up to 4 C atoms, hydroxyalkoxyalkoxy having up to 6 C atoms, cyanoalkoxy having 2 to 5 C atoms, cyanoalkoxy having 2 to 5 C atoms, $(C_1-C_4)$-alkylcarbonyloxy, $(C_1-C_4)$-alkoxycarbonyloxy, $(C_1-C_4)$-alkoxycarbonyl or $(C_1-C_4)$-alkylcarbonyloxy, $(C_1-C_4)$-alkoxycarbonyloxy or $(C_1-C_4)$-alkoxycarbonyl which are substituted by hydroxyl, chlorine, bromine, cyano or $(C_1-C_4)$-alkoxy; allyl; hydrogen, or one of the radicals $R^1$ or $R^2$ furthermore is phen-$(C_0-C_3)$-alkyl, phenoxyethyl or cyclohexyl.

The invention also relates to mixtures of dyestuffs of the general formula I and to the preparation of these dyestuffs and their mixtures and their use for dyeing and printing hydrophobic fibre materials and for dyeing and printing blended fabrics of polyester and cotton, regenerated cellulose or wool, and their use for the preparation of dyeings which have a thermomigration-fast finish on fibre materials which comprise polyester.

Alkyl and alkoxy groups can be straight-chain or branched, primarily branched being preferred and straight-chain being particularly preferred.

$(C_1-C_4)$-alkyl is, for example, methyl, ethyl, n-propyl, i-propyl, n-butyl, i-butyl and sec-butyl. An analogous definition applies to $(C_1-C_4)$-alkoxy.

$(C_1-C_4)$-alkyl substituted by hydroxyl or $(C_1-C_4)$-alkoxy is, for example, 2-hydroxyethyl, 4 -hydroxybutyl, 2,3-dihydroxypropyl, 2-methoxy-, 2-ethoxy-, 2-n-propoxy-, 2-i-propoxy-, 2-n-butoxy, 2-i-butoxy-, 2-sec-butoxy- and 2-tert-butoxyethyl, 3-methoxy-, 3-ethoxy-, 3-n-propoxy-, 3-i-propoxy-, 3-n-butoxy- and 3-sec-butoxypropyl, 4-methoxy-, 4-ethoxy, 4-n-propoxy- and 4-n-butoxybutyl and 2-hydroxy-3-methoxy-, -3-ethoxy- or -3-n-butoxypropyl.

$(C_1-C_4)$-alkyl substituted by chlorine, bromine or cyano is, for example, cyanomethyl, 2-chloro-, 2-bromo- or 2-cyanoethyl, 3-cyanopropyl and 4-chloro-, 4-bromo- or 4-cyanobutyl.

$(C_1-C_4)$-alkyl substituted by phenoxy or phenyl is, for example, phenoxymethyl, -ethyl, -propyl and -butyl, benzyl, phenethyl and phenpropyl.

$(C_1-C_4)$-alkoxy substituted by hydroxyl or $(C_1-C_4)$-alkoxy is, for example, 2-hydroxyethoxy, 4-hydroxybutoxy, 2-hydroxypropoxy, 2,3-dihydroxypropoxy; 2-methoxy-, 2-ethoxy-, 2 -n-propoxy-, 2-i-propoxy-, 2-n-butoxy-, 2-i-butoxy- or 2-tert-butoxy-ethoxy or 3-methoxy-propoxy; or 4-methoxy-, 4-ethoxy- or 4-n-butoxy—butoxy.

$(C_1-C_4)$-alkoxy substituted by chlorine, bromine or cyano is, for example, 2-chloro-, 2-bromo- or 2-cyanoethoxy or 4-chloro-, 4-bromo- or 4-cyanobutoxy.

Alkoxyalkoxy having a total of up to 6 C atoms is, for example, methoxy-, ethoxy-, n-propoxy-, i-propoxy-, n-butoxy-, i-butoxy- and sec-butoxy-ethoxy and 4-methoxy- and 4-ethoxy-butoxy.

Hydroxyalkoxy having up to 4 C atoms is, for example, 2-hydroxyethoxy or 4-hydroxybutoxy.

Hydroxyalkoxyalkoxy having a total of up to 6 C atoms is, for example, hydroxyethoxyethoxy or 4-hydroxybutoxy-ethoxy. Cyanoalkoxy having 2 to 5 C atoms is, for example, 2-cyanoethoxy or 4-cyanobutoxy.

The substitution on a $(C_1-C_4)$-alkyl radical can also be di- or polysubstitution. Examples of these are 2-hydroxy-3 -methoxy-, -3-ethoxy-, -3-n-butoxy- or -3-phenoxy-propyl or 2,3-dihydroxypropyl, 2-acetoxy-3-methoxy-, -3-ethoxy- or -3 -i-butoxy-propyl, 2-propionoxy-3-methoxy-, -3-ethoxy- or -3-i-propoxy-propyl, 2,3-diacetoxypropyl or 2,3-dipropionoxypropyl.

A preferred radical $X^2$ is nitro and a preferred radical $X^3$ is hydrogen. Preferably, only one of the radicals $X^1$ and $X^2$ is nitro.

If $X^1$ is nitro, $X^2$ is preferably chlorine or bromine. A preferred combination $X^1/X^2/X^3$ is $NO_2$/Br/H. A particularly preferred combination is H/$NO_2$/H.

A preferred radical Y is hydrogen.

R preferably represents optionally substituted $(C_1-C_4)$-alkylsulphonylamino, optionally substituted $(C_1-C_2)$-alkoxycarbonylamino and substituted $(C_1-C_2)$-alkylcarbonylamino. R particularly preferably represents $(C_1-C_2)$-alkylcarbonylamino.

Preferred radicals $R^1$ and $R^2$ are methyl, n-propyl and allyl, and in particular ethyl. Preferably, at least one of the radicals $R^1$ and $R^2$ represents a substituted $(C_1-C_4)$-alkyl radical, and in particular a substituted ethyl radical.

The substituted $(C_1-C_4)$-alkyl radicals $R^1$ and $R^2$ are preferably substituted by $(C_1-C_4)$-alkoxy, alkoxyalkoxy having a total of up to 6 C atoms, optionally substituted $(C_1-C_2)$-alkylcarbonyloxy, optionally substituted $(C_1-C_2)$-alkoxycarbonyloxy or cyano, and in particular optionally substituted $(C_1-C_2)$-alkoxycarbonyl or cyano.

Particularly preferred dyestuffs are those having one, and in particular those having two or more, particularly preferred feature.

Dyestuffs similar to the dyestuffs according to the invention are described, for example, in EP 38615, EP 73875 or Japanese Laid-Open Specification 60-44557. However, it has been found, surprisingly, that the dyestuffs according to the invention are significantly superior to these known dyestuffs in their dyeing properties on various substrates and in some fastness properties during use, such as fastness to thermomigration, fastness to water, fastness to thermofixing, fastness to light and fastness to solvents.

Another important advantage is the convenient and therefore inexpensive synthesis of the diazo components of dyestuffs according to the invention. They are accessible in few synthesis steps starting from precursors which are relatively cheap since they are available on a relatively large industrial scale. The synthesis steps here are standard reactions of organic chemistry, such as nitration or halogenation, which can be carried out in an aqueous system or mineral acids, that is to say without solvents.

In contrast, for example, the diazo components of the dyestuffs from EP 38615 and EP 73875 are prepared in a multi-stage synthesis in which the aromatic diazo component is built up from aliphatic synthesis units. The last step, the cyclizing condensation to give the aromatic, is described, for example, in H. W. Schmidt, H. Junek: Liebigs Ann. Chem. 1979, 2005; H. W. Schmidt, M. Kores: Liebigs Ann. Chem. 1988, 1001 or I. R. BAKER et. al.: J. Chem. Soc. Perkin I 1979, 677. Information on the synthesis of the alkoxymethylene-substituted 1,3-dicarbonyl compound required for this is to be found, for example, in R. G. Jones: J. Am. Chem. Soc. 74, 4889 (1952).

These reactions proceed only with exclusion of water. Working up is carried out by distillation, or the reaction must be followed by distillative regeneration of the solvents employed. This requires cost-intensive plants for the distillation, and also for handling or storage of these solvents.

The preparation of the diazo component of the formula IIa

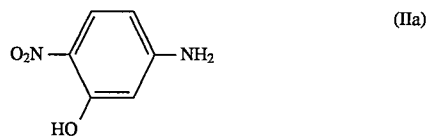

can be carried out in accordance with the instructions in F. Reverdin: Ber. Dtsch. Chem. Ges. 47, 2216 (1914) by nitration of 3-acetoxyacetanilide and subsequent hydrolysis, or in accordance with the instructions in Swiss Patent Specification 624400 by treatment of N-acetyl-m-aminophenol with nitrous and nitric acid and subsequent hydrolysis. In accordance with the instructions in M. A. Phillips: J. Chem. Soc. 1930, 1913, it can also be carried out by diazotization and decomposition to phenol of 4-nitro-3-aminoacetanilide and subsequent hydrolysis, or in accordance with the doctrine of German Patent Specification 285638 by nucleophilic substitution of the sulpho group of 2-nitro-5-acetylaminobenzenesulphonic acid by means of aqueous alkali. One or two halogens can easily be introduced into the o-position of the aniline of the formula IIa by electrophilic halogenation of this aniline.

The diazo component of the formula IIb

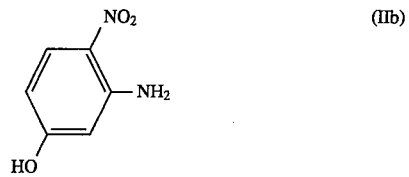

can also be prepared in accordance with the instructions in M. A. Phillips: J. Chem. Soc. 1930, 1913. Here also the halogen substituents can easily be introduced into the desired position(s) by electrophilic aromatic substitution.

A synthesis for the diazo component of the formula IIc

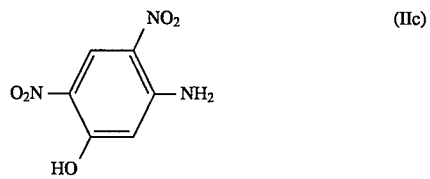

is to be found, for example, in Bell: J. Chem. Soc. 1931, 2352. IIc can also be halogenated electrophilically in its free o-position.

The diazo component of the formula IId

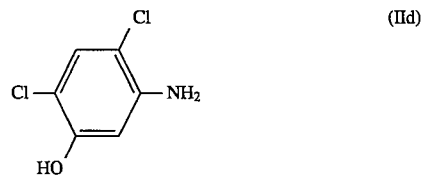

can be prepared, for example, by reduction of the nitro group in commercially available 2,4-dichloro-5-nitrophenol.

The preparation of the dyestuffs of the general formula I is carried out by processes known to the expert, preferably by a procedure in which an amine of the formula II

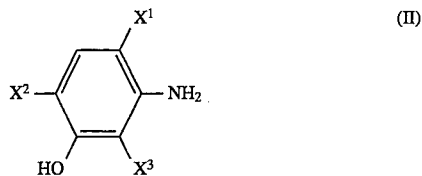

is diazotized and the diazotization product is coupled to an amine of the formula III

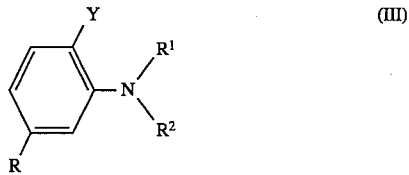

wherein the radicals $X^1$, $X^2$, $X^3$, Y, R, $R^1$ and $R^2$ have the above-mentioned meanings.

For this, for example, solutions of diazonium compounds of the corresponding amines are prepared from the amines of the formula II at 0° to 40° C. by the action of nitrous acid or other systems which form nitrosonium ions in a mineral acid aqueous medium, a lower alkanecarboxylic acid, such as, for example, formic acid, acetic acid or propionic acid or mixtures thereof, or in an organic solvent.

The coupling is carried out, for example, by combining the resulting solution of the diazonium compound with a solution of the coupling component at temperatures of 0° to 40° C., preferably 0° to 25° C., in a suitable solvent, such as, for example, an alkanol having 1 to 4 C atoms or dimethylformamide, preferably in water acidified with sulphuric acid, hydrochloric acid or phosphoric acid or an optionally aqueous lower alkane carboxylic acid or a lower alkane carboxylic acid mixture, if appropriate also in the presence of an alkanol of limited water-miscibility. In some cases, it may be expedient to buffer the pH during the coupling, for example by addition of sodium acetate. The coupling has ended after a few hours, and the dyestuff of the formula I can be isolated and dried in the customary manner.

The dyestuffs of the general formula I can also be employed as mixtures with one another. Such dyestuff mixtures preferably comprise three, particularly preferably two, dyestuffs of the general formula I. The ratio of the various dyestuffs of the general formula I can vary within relatively wide limits. In general, the minimum weight content of a component is 10% and its maximum weight content is 90%. In the case of dyestuff mixtures which comprise only two dyestuffs of the general formula I, a weight ratio of 70:30 to 30:70 is preferred, that is to say the weight content of a dyestuff is 30 to 70%.

The mixtures according to the invention can be prepared by mixing the separately prepared and finished individual dyestuff components. This mixing can be effected in suitable mixers or mills or by stirring the component into the dye liquor. However, it is preferable for the separately prepared individual dyestuff components to be finished together, in which case mixing can be carried out during the preparation of dyestuff powders immediately before spray drying, in the case of dyestuff powders and liquid dyestuff preparations, preferably before grinding. Joint heat stabilization before grinding is particularly preferred here.

The dyestuffs of the general formula I and their mixtures with one another can also be employed in mixtures with other dyestuffs.

The dyestuffs and dyestuff mixtures according to the invention are outstandingly suitable, individually or as a mixture with other disperse dyestuffs, for dyeing and printing hydrophobic synthetic materials. Possible hydrophobic synthetic materials are, for example: cellulose 2½-acetate, cellulose triacetate, polyamides and high molecular weight polyesters. The dyestuffs according to the invention are preferably employed for dyeing and printing materials of high molecular weight polyesters, in particular those based on polyethylene glycol terephthalates or mixtures thereof with natural fibre materials, such as, in particular, cellulose, or materials of cellulose triacetate.

The hydrophobic synthetic materials can be in the form of flat or thread-like structures and can be processed, for example, to yarns or woven, knitted or looped textile materials. Dyeing of the fibre goods mentioned with the dyestuffs or dyestuff mixtures according to the invention can be carried out in a manner known per se, preferably from aqueous dispersion, if appropriate in the presence of carriers, at between 80° and about 110° C. by the exhaust process or by the HT process in a dyeing autoclave at 110° to 140° C., and by the so-called thermofixing process, in which the goods are padded with the dye liquor and then fixed at about 180° to 230° C. The materials mentioned can be printed in a manner known per se by a procedure in which the dyestuffs or dyestuff mixtures according to the invention are incorporated into a printing paste and the goods printed with the paste are treated, if appropriate in the presence of a carrier, with HT steam, pressurized steam or dry heat at temperatures between 180° and 230° C. to fix the dyestuff. Very deep golden yellow to blue dyeings and prints with very good fastnesses, in particular with very good fastnesses to light, rubbing, thermofixing, washing, water and thermomigration, are obtained in this way.

When used in discharge and resist printing, such as is described, for example, in Rev. Prog. Coloration Vol. 18, page 29 et seq., (1988), in particular in alkaline discharge resist printing, prints having a very good white or coloured background with sharp contours are obtained.

The dyestuffs or dyestuff mixtures according to the invention are also suitable for dyeing the abovementioned hydrophobic materials from organic solvents by the methods known here and for bulk dyeing.

The superiority of the dyestuffs according to the invention becomes particularly clear when the dyed fibre materials are also subjected to subsequent heat treatment. This heat treatment can be, for example, thermofixing at about 180° C., which is customary in practice, or a heat treatment which is necessary if the dyed fibre material is provided with a synthetic resin finish, in order to crosslink the synthetic resin applied. During this heat treatment, commercially available dyestuffs usually migrate to the fibre surface, are detached during a domestic wash and stain undyed or differently dyed accompanying material. This effect manifests itself particularly strikingly, for example, in the case of sports clothing articles of textured polyester or polyester/cotton materials.

As is known, these articles are often set off with white fabric sections of the same or a different (for example polyamide) fibre material for decoration, which are then stained during washing.

The dyestuffs or dyestuff mixtures according to the invention should be present in the finest possible dispersion in the dye liquors and printing pastes employed in the above applications.

The fine dispersion of the dyestuffs is effected in a manner known per se by a procedure in which the dyestuff obtained during preparation is suspended in a liquid medium, preferably in water, together with dispersing agents and the mixture is exposed to the action of shearing forces, the dyestuff particles originally present being comminuted mechanically to the extent that an optimum specific surface area is achieved and sedimentation of the dyestuff is as low as possible. The particle size of the dyestuffs is in general between 0.5 and 5 µm, preferably about 1 µm.

The dispersing agents also used in the grinding operation can be nonionic or anionic. Nonionic dispersing agents are, for example, reaction products of alkylene oxides, such as, for example, ethylene oxide or propylene oxide, with alkylatable compounds, such as, for example, fatty alcohols, fatty amines, fatty acids, phenols, alkylphenols and carboxylic acid amides. Anionic dispersing agents are, for example, lignin-sulphonates, alkyl- or alkylarylsulphonates or alkylaryl polyglycol ethersulphates.

For most methods of use, the dyestuff formulations thus obtained should be pourable. The dyestuff and dispersing agent content is therefore limited in these cases. In general, the dispersions are brought to a dyestuff content of up to 50 per cent by weight and a dispersing agent content of up to 25%. For economic reasons, the dyestuff contents usually do not fall below 15 per cent by weight.

The dispersions can also comprise other auxiliaries, for example those which act as oxidizing agents, such as, for example, sodium m-nitrobenzenesulphonate, or fungicidal agents, such as, for example, sodium o-phenyl-phenolate and sodium pentachlorophenolate.

The dyestuff dispersions thus obtained can be used very advantageously for the preparation of printing pastes and dye liquors. They offer particular advantages, for example, in the continuous processes in which the dyestuff concentration of the dye liquors must be kept constant by continuously feeding dyestuff into the running apparatus.

For certain fields of use, powder formulations are preferred. These powders comprise the dyestuff or the dyestuff mixture, dispersing agents and other auxiliaries, such as, for example, wetting agents, oxidizing agents, preservatives and dust removal agents.

A preferred preparation process for pulverulent dyestuff formulations comprises removing the liquid from the liquid dyestuff dispersions described above, for example by vacuum drying, freeze drying, by drying on roller dryers, but preferably by spray drying.

To prepare the dye liquors, the required amounts of the dyestuff formulations which have been prepared in accordance with the above instructions are diluted with the dyeing medium, preferably with water, to the extent that a liquor ratio of 1:5 to 1:50 results for the dyeing. Other dyeing auxiliaries, such as dispersing, wetting and fixing auxiliaries, are in general additionally added to the liquors.

If the dyestuff or the dyestuff mixture is to be used for textile printing, the required amounts of the dyestuff formulations are kneaded to printing pastes together with thickening agents, such as, for example, alkaline metal alginates or the like, and if appropriate other additives, such as, for example, fixing accelerators, wetting agents and oxidizing agents.

The invention is explained in more detail by the following examples. Percentage data are percentages by weight and parts are parts by weight.

EXAMPLE 1 a) 15.4 g of 2-nitro-5-aminophenol are diazotized with 33.4 g of 40% strength nitrosylsulphuric acid in 100 ml of glacial acetic acid at 10° to 15° C. and the diazotization product is coupled to an aqueous acetic acid solution of 33.8 g of N-acetyl-N',N'-bis-(2-ethoxycarbonylethyl)-phenylene-1,3-diamine at 0° to 5° C., while cooling directly with 1000 g of ice-water. When the coupling has ended, the dyestuff formed is filtered off with suction, washed with water and dried under reduced pressure. It gives: 41.2 g of the dyestuff of the formula

which dissolves in o-dichlorobenzene to give a red-coloured solution and has its absorption maximum at 519 nm.

b) In a finishing process which is customary in practice, this dyestuff is converted into a liquid dyestuff preparation comprising 20% of pure dyestuff by aqueous grinding in a bead mill with a dispersing agent customary in practice which is based on lignin-sulphonate.

c) 3 g of the dyestuff preparation thus obtained are dispersed in 2000 g of water. 3.6 ml of 85% strength phosphoric acid are added to the dispersion, the pH is brought to 4.5 with sodium hydroxide solution and 2 g of a commercially available dispersing agent based on a naphthalenesulphonic acid/formaldehyde condensate are added. 100 g of a polyester woven fabric based on polyethylene glycol terephthalate are introduced into the dye liquors thus obtained and dyeing is carried out at 130° C. for 30 minutes. After subsequent rinsing, reductive after-treatment with a 0.2% strength aqueous sodium dithionite solution at 70° to 80° C. for 15 minutes, rinsing and drying, a deep ruby-red dyeing having very good colouristic properties, in particular very good fastness to thermofixing, thermomigration and washing, is obtained.

EXAMPLE 2 a) If the 33.8 g of N-acetyl-N',N'-bis-(2-ethoxycarbonylethyl)phenylene-1,3-diamine in Example 1a) are replaced by 24.3 g of N-acetyl-N'-(2-cyanoethyl)-N'-ethyl-phenylenediamine, 33.7 g of the dyestuff of the formula

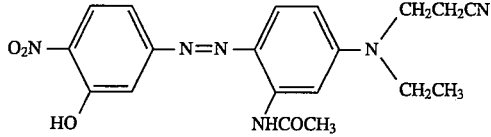

which dissolves in o-dichlorobenzene to give a bluish-tinged red-coloured solution and has its absorption maximum at 518 nm are obtained.

b) In a finishing process customary in practice, this dyestuff is ground under aqueous conditions in the presence of dispersing agents, as described in Example 1b), and then subjected to spray drying. A pulverulent dyestuff preparation having a content of pure dyestuff of 20% is obtained in this manner. A dye liquor is prepared with 3 g of this dyestuff preparation as described in Example 1c), and 100 g of a polyester/viscose staple blended fabric (70:30) are dyed therein at 150° C. for 45 minutes, and the dyeing is finished as in Example 1c). This dyeing is then subjected to a synthetic resin finishing. For this, the dyeing is padded with a padding liquor which comprises 40 g/l of a reactant resin based on dimethylol-dihydroxyethylene urea, 20 g/l of a melamine resin, 20 g/l of a polyethylene emulsion., 20 g/l of a silicone-based plasticizer and 8 g/l of an amine salt, dried at 100° C. for 1 minute and subjected to condensation at 180° C. for 30 seconds. The dyeing finished in this way is subjected to a wash-fastness test in accordance with M+S specification C4A in the presence of a multiple-fibre tape. The multiple-fibre tape is hardly stained at all with this test.

EXAMPLE 3 a) If, analogously to the instructions in Example 1, 15.4 g of 3-amino-4-nitrophenol are diazotized and the diazotization product is coupled to 28.0 g of N-acetyl-N',N'-bis-(2-methoxyethyl)-phenylene-1,3-diamine, 38.7 g of the dyestuff of the formula

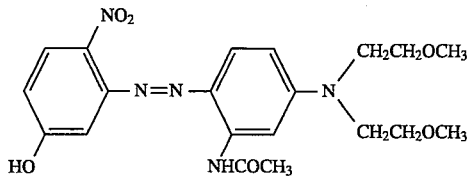

which dissolves in o-dichlorobenzene to give an orange-coloured solution and has its absorption maximum at 482 nm are obtained.

b) 20.0 g of the dyestuff of Example 2a) are incorporated in finely dispersed form into a printing paste which comprises 45.0 g of carob bean flour, 6.0 g of sodium-m-nitrobenzenesulphonate and 3.0 g of citric acid per 1000 g. If a polyester woven fabric is printed with this printing paste and, after drying, the printed fabric is steamed under a steam pressure of 1.5 atmospheres gauge for 15 minutes, rinsed, soaped and rinsed again, a deep orange-coloured print having very good colouristic properties is obtained.

EXAMPLE 4 a) If the 15.4 g of 2-nitro-5-aminophenol of Example 1a) are replaced by 17.8 g of 2,4-dichloro-5-aminophenol and coupling is likewise carried out to 28.0 g of N-acetyl-N',N'-bis-(2-methoxyethyl)phenylene-1,3-diamine, 34.1 g of the dyestuff of the formula

which dissolves in o-dichlorobenzene to give an orange-coloured solution and has its absorption maximum at 478 nm are obtained.

b) 30 g of a liquid preparation which comprise 25% of pure dyestuff of Example 4a) are stirred together with 15 g of a commercially available antimigration agent and 2 g of monosodium phosphate into a padding liquor such that the final volume thereof is 1 liter. A 65:35 polyester/cotton blended fabric is impregnated with this padding liquor at 25° C., squeezed off to a liquid uptake of about 65%, predried in an infra-red dryer for 30 seconds and dried at 110° C. for 60 seconds, and the disperse dyestuff is fixed in the polyester fibre at 210° C. for 60 seconds. The predyed blended fabric is then subjected to the dyeing conditions of a subsequent reactive dyeing, but without the dyestuff. For this, the blended fabric is padded at 25° C. with a chemicals bath which comprises 240 g/liter of sodium chloride, 15 g/liter of sodium carbonate, 11.3 g/liter of a 50% strength sodium hydroxide solution and 4 g/liter of an oxidizing agent based on a benzenesulphonic acid derivative, squeezed off to a liquid uptake of 90–100% and steamed at 102°–105° C. for 45 seconds. Finally, the blended fabric is rinsed in hot water and dried. The cotton content of the blended fabric has hardly been stained at all by this procedure, so that during subsequent cross-dyeing of this cotton content with an orange-coloured reactive dyestuff of the same colour shade, a clear overall dyeing can be obtained.

EXAMPLE 5

20 g of 35% strength hydrogen peroxide solution are added to 30.8 g of 3-amino-4-nitrophenol in 250 ml of glacial acetic acid. 32.5 g of bromine are added dropwise at 40° C. and the mixture is subsequently stirred at 40° C. for 3 hours. The product which has precipitated out is filtered off with suction, washed with glacial acetic acid and H20 and dried. 43 g of a yellow powder which melts at 156° C. are obtained. According to 1H-NMR in DMSO (signals at 8.3 ppm and 7.4 ppm) and bromine analysis (50.3% of Br), the product of the formula

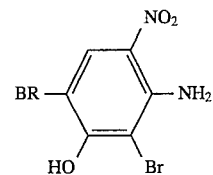

is present.

The dyestuffs according to the invention in the following tables can be prepared analogously to Examples 1 to 4. They likewise dye hydrophobic fibres in full golden yellow to blue shades having excellent fastnesses.

TABLE 1

| $X^1$ | $X^3$ | Y | R | $R^1$ | $R^2$ |
|---|---|---|---|---|---|
| H | H | H | $NHCOCH_3$ | $(CH_2)_2COOCH_3$ | $(CH_2)_2COOCH_3$ |
| H | H | H | $NHCOC_2H_5$ | $(CH_2)_2COOC_2H_5$ | $(CH_2)_2COOC_2H_5$ |
| H | H | H | $NHCOCH_3$ | $(CH_2)_2COOnC_4H_9$ | $(CH_2)_2COOnC_4H_9$ |
| H | H | H | $NHCOCH_3$ | $(CH_2)_2COO(CH_2)_2OCH_3$ | $(CH_2)_2COO(CH_2)_2OCH_3$ |
| H | H | H | $NHCOCH_3$ | $(CH_2)_2COOCH_3$ | $(CH_2)_2COOC_2H_5$ |
| H | H | H | $NHCOiC_3H_7$ | $(CH_2)_2COOCH_3$ | $(CH_2)_2CN$ |
| H | H | H | $NHCOCH_3$ | $(CH_2)_2COOC_2H_5$ | $(CH_2)_3CN$ |
| H | H | H | $NHCOC_2H_5$ | $(CH_2)_2COOCH_3$ | $(CH_2)_2OCOCH_3$ |
| H | H | H | $NHCOCH_3$ | $(CH_2)_2COOCH_3$ | $(CH_2)_2OCOOCH_3$ |
| H | H | H | $NHCOCH_3$ | $(CH_2)_2OCOCH_3$ | $(CH_2)_2OCOCH_3$ |
| H | H | H | $NHCOC_2H_5$ | $(CH_2)_2OCOCH_3$ | $(CH_2)_2OCOCH_3$ |
| H | H | H | $NHCOCH_3$ | $(CH_2)_2OCOCH_3$ | $(CH_2)_2CN$ |
| H | H | H | $NHCOCH_3$ | $(CH_2)_2OCH_3$ | $(CH_2)_2OCH_3$ |
| H | H | H | $NHCOCH_3$ | $(CH_2)_2OC_2H_5$ | $(CH_2)_2CN$ |
| H | H | H | $NHCOC_2H_5$ | $[(CH_2)_2O]_2CH_3$ | $(CH_2)_2CN$ |
| H | H | H | $NHCOCH_3$ | $(CH_2)_2CN$ | $(CH_2)_2CN$ |
| H | H | H | $NHCOCH_3$ | $C(CH_3)_2COOC_2H_5$ | H |
| H | H | H | $NHCOC_2H_5$ | $CH(CH_3)COOC_2H_5$ | H |
| H | H | H | $NHCOCH_3$ | $(CH_2)_2CH$ | $(CH_2)CH$ |
| H | H | H | $NHCOCH_3$ | $(CH_2)_2OCOOCH_3$ | $(CH_2)_2OCOOCH_3$ |
| H | H | H | $NHCOCH_3$ | $C_6H_5$ | $(CH_2)_2OH$ |
| H | H | H | $NHCOCH_3$ | $CH_2CH(CH_3)_2$ | H |
| H | H | H | $NHCOCH_3$ | $(CH_2)_2CN$ | $CH_2CH=CH_2$ |
| H | H | H | $NHCOC_2H_5$ | $(CH_2)_2COOC_2H_5$ | $nC_3H_7$ |
| H | H | H | $NHCOCH_3$ | $(CH_2)_2COOCH_3$ | $C_2H_5$ |
| H | H | H | $NHCOCH_3$ | $C_2H_5$ | $C_2H_5$ |
| H | H | H | $NHCOCH_3$ | $(CH_2)_2CN$ | $(CH_2)_2CH$ |
| H | H | H | $NHCOnC_3H_7$ | $C_2H_5$ | $CH_2CH(CH)CH_2OnC_4H_9$ |
| H | H | H | $NHCOO(CH_2)_2OC_2H_5$ | $C_2H_5$ | $C_2H_5$ |
| H | H | H | $NHCOO(CH_2)_2OCH_3$ | $(CH_2)_2OCOCH_3$ | $(CH_2)_2OCOCH_3$ |
| H | H | H | $NHCOCH_2OCH_3$ | $(CH_2)_2CN$ | $(CH_2)_2OH$ |
| H | H | H | $NHCO(CH_2)_2Cl$ | $C_2H_5$ | $C_2H_5$ |
| H | H | H | $NHCO(CH_2)_3OH$ | $(CH_2)_2COOC_2H_5$ | $(CH_2)_2COOC_2H_5$ |
| H | H | H | $NHCOCH_2OC_6H_5$ | $(CH_2)_2OCOC_2H_5$ | $(CH_2)_2OH$ |
| H | H | H | $NHSO_2CH_3$ | $C_2H_5$ | $C_2H_5$ |
| H | H | H | $NHSO_2CH_3$ | $(CH_2)_2OCOCH_3$ | $(CH_2)_2OCOCH_3$ |

TABLE 1-continued

[Structure: a benzene ring with substituents $X^1$ (top), $O_2N-$ (left), $OH$ (bottom), $X^3$, connected via $N=N$ to another benzene ring with $Y$ (top), $R$ (bottom), and $N(R^1)(R^2)$ group]

| $X^1$ | $X^3$ | Y | R | $R^1$ | $R^2$ |
|---|---|---|---|---|---|
| H | H | H | $NHSO_2CH_3$ | $(CH_2)_2COOCH_3$ | $(CH_2)_2COOCH_3$ |
| H | H | H | $NHSO_2CH_3$ | $(CH_2)_2CN$ | $(CH_2)_2OCOOCH_3$ |
| H | H | H | $NHSO_2CH_3$ | $(CH_2)_2Cl$ | $(CH_2)_2OCOC_2H_5$ |
| H | H | H | $NHSO_2C_2H_5$ | $(CH_2)_2OCH_3$ | $(CH_2)_2OCH_3$ |
| H | H | H | $NHSO_2(CH_2)_2Cl$ | $nC_3H_7$ | $nC_3H_7$ |
| H | H | Cl | $NHCOCH_3$ | $CH_2CH(OH)CH_3$ | H |
| H | H | Cl | $NHCOCH_3$ | $(CH_2)_2COOCH_3$ | H |
| H | H | Cl | $NHCOCH_3$ | $CH_2CH(OCOCH_3)CH_2OC_2H_5$ | H |
| H | H | Cl | $NHCOC_2H_5$ | $(CH_2)_2COOC_2H_5$ | H |
| H | H | Cl | $NHSO_2CH_3$ | $(CH_2)_2OC_6H_5$ | H |
| H | H | Cl | $NHSO_2CH_3$ | $CH_2CH(OH)CH_2OnC_4H_9$ | H |
| H | H | Cl | $NHSO_2CH_3$ | $CH_2CH(OH)CH_3$ | H |
| H | H | $OCH_3$ | $CH_3$ | $C_2H_5$ | $C_2H_5$ |
| H | H | $OCH_3$ | Cl | $[(CH_2)_2O]_3H$ | $[(CH_2)_2O]_3H$ |
| H | H | $OCH_3$ | $OCH_3$ | $(CH_2)_2COO(CH_2)_2OCH_3$ | $(CH_2)_2COO(CH_2)_2OCH_3$ |
| H | H | Cl | $(CH_2)_2CN$ | H | |
| H | H | $OCH_3$ | H | $(CH_2)_2COOC_2H_5$ | H |
| H | H | H | OH | $(CH_2)_2COOC_2H_5$ | $nC_4H_9$ |
| H | H | H | OH | $(CH_2)_2CN$ | $(CH_2)_2OCH_3$ |
| H | H | H | $OCH_3$ | $(CH_2)_2COOiC_3H_7$ | H |
| H | H | H | $OCH_3$ | $(CH_2)_2OH$ | $(CH_2)_2OH$ |
| H | H | H | $OC_2H_5$ | $CH_2CH(OH)CH_2OCH_3$ | H |
| H | H | H | $CH_3$ | $(CH_2)_2OCOCH_3$ | $(CH_2)_2OCOCH_3$ |
| H | H | H | $CH_3$ | $(CH_2)_2OCOCH_3$ | $(CH_2)_2CN$ |
| H | H | H | $CH_3$ | $(CH_2)_2OC_6H_5$ | $C_2H_5$ |
| H | H | H | $CH_3$ | $C_2H_5$ | $(CH_2)_2COOC_2H_5$ |
| H | H | H | $CH_3$ | $CH_2CH(OH)CH_2OH$ | $CH_3$ |
| H | H | H | $CH_3$ | $(CH_2)_2C_6H_5$ | $(CH_2)_2CN$ |
| H | H | H | $CH_3$ | $[(CH_2)_2O]_2C_2H_5$ | $[(CH_2)_2O]_2C_2H_5$ |
| H | H | H | $CH_3$ | $(CH_2)_2COOCH_3$ | $(CH_2)_2OCH_3$ |
| H | H | H | Cl | $(CH_2)_2OH$ | $(CH_2)_2OH$ |
| H | H | H | Cl | $(CH_2)_2OCOOC_2H_5$ | $(CH_2)_2OCOOC_2H_5$ |
| H | H | $OCH_3$ | $NHCOCH_3$ | $(CH_2)_2OCOCH_3$ | $(CH_2)_2OCOCH_3$ |
| H | H | $O(CH_2)_2OCH_3$ | $NHCOC_2H_5$ | $(CH_2)_2OCOCH_3$ | H |
| H | H | H | H | $(CH_2)_2OCOCH_3$ | $(CH_2)_2OCOCH_3$ |
| H | H | H | H | $(CH_2)_2CN$ | $(CH_2)_2OH$ |
| H | H | H | H | $(CH_2)_2CN$ | $(CH_2)_2OCOCH_3$ |
| H | H | H | H | $(CH_2)_2CN$ | $(CH_2)_2COOC_2H_5$ |
| H | H | H | H | $(CH_2)_2COOCH_3$ | $(CH_2)_2COOCH_3$ |
| H | H | H | H | $CH_2CH(OH)CH_2O(CH_2)_2OCH_3$ | H |
| H | H | H | H | $(CH_2)_2OC_2H_5$ | $(CH_2)_2OC_2H_5$ |
| H | H | H | H | $(CH_2)_2COOCH_3$ | $(CH_2)_2C_6H_5$ |
| Br | H | H | $NHCOCH_3$ | $(CH_2)_2CN$ | $(CH_2)_2OCOCH_3$ |
| Br | H | H | $NHCOCH_3$ | $[(CH_2)_2O]_2CH_3$ | $[(CH_2)_2O]_2CH_3$ |
| Br | H | H | $NHSO_2CH_3$ | $nC_3H_7$ | $nC_3H_7$ |
| Br | H | Cl | $NHCOCH_3$ | $CH_2CH(OH)CH_2OCH_3$ | H |
| Br | H | $OCH_3$ | $NHCOCH_3$ | $(CH_2)_2CN$ | $CH_2CH=CH_2$ |
| Br | H | Cl | H | $(CH_2)_2COOC_2H_5$ | H |
| Br | H | H | OH | $nC_4H_9$ | $nC_4H_9$ |
| Br | H | H | H | $(CH_2)_2OCOC_2H_5$ | $(CH_2)_2OCOC_2H_5$ |
| Br | H | H | H | $CH_2C_6H_5$ | $(CH_2)_2CH$ |
| Cl | H | $OC_2H_5$ | $NHCOCH_3$ | $(CH_2)_2COO(CH_2)_2CN$ | H |
| Cl | H | $O(CH_2)_2OCH_3$ | $NHCOC_2H_5$ | $C_2H_5$ | H |
| Cl | H | $OCH_3$ | $NHSO_2CH_3$ | $(CH_2)_2OCH_3$ | $(CH_2)_2OCH_3$ |
| Cl | H | H | $NHCOCH_3$ | $(CH_2)_2OnC_4H_9$ | $(CH_2)_2OnC_4H_9$ |
| Cl | H | H | $NHCOiC_3H_7$ | $(CH_2)_2COOiC_3H_7$ | $(CH_2)_2COOiC_3H_7$ |
| Cl | H | H | $NHSO_2CH_3$ | $CH(CH_3)C_2H_5$ | H |
| Cl | H | Cl | $NHCOCH_3$ | $CH_2CH(OH)CH_2OC_2H_5$ | H |
| Cl | H | H | $CH_3$ | $(CH_2)_2CN$ | $(CH_2)_2OCOCH_3$ |
| Cl | H | H | OH | $nC_4H_9$ | $(CH_2)_2COOC_2H_5$ |
| Cl | H | H | H | $(CH_2)_4OH$ | $(CH_2)_4OH$ |
| Cl | H | H | H | $(CH_2)_2CN$ | $(CH_2)_3COOC_2H_5$ |
| Cl | H | H | H | $(CH_2)_2C_6H_5$ | $(CH_2)_2CN$ |
| Br | Br | $OCH_3$ | $NHCOCH_3$ | $(CH_2)_2OCOCH_3$ | $(CH_2)_2OCOCH_3$ |
| Br | Br | $OCH_3$ | $NHCOCH_3$ | $C_2H_5$ | $C_2H_5$ |
| Br | Br | $OCH_3$ | $NHCOCH_3$ | $(CH_2)_2CN$ | $(CH_2)_2OH$ |
| Br | Br | H | $NHCOC_2H_5$ | $(CH_2)_2OCOCH_3$ | $(CH_2)_2OCOCH_3$ |
| Br | Br | H | H | $[(CH_2)_2O]_2H$ | $[(CH_2)_2O]_2H$ |

TABLE 1-continued

[Structure: 4-nitro-phenol with X¹, X³ substituents, azo-linked to aniline with Y, R, NR¹R² substituents]

| X¹ | X³ | Y | R | R¹ | R² |
|---|---|---|---|---|---|
| Br | Br | H | H | (CH₂)₂CN | (CH₂)₂CN |
| Cl | Cl | OCH₃ | NHCOCH₃ | (CH₂)₂OCOCH₃ | (CH₂)₂OCOCH₃ |
| Cl | Cl | OC₂H₅ | NHCOCH₃ | CH₂CH=CH₂ | (CH₂)₂CN |
| Cl | Cl | O(CH₂)₂OCH₃ | NHCOC₂H₅ | (CH₂)₄OCH₃ | H |
| Cl | Cl | H | H | CH₂COOnC₄H₉ | (CH₂)₂OH |

TABLE 2

[Structure: nitro-phenol with X², X³ substituents, azo-linked to aniline with Y, R, NR¹R² substituents]

| X² | X³ | Y | R | R¹ | R² |
|---|---|---|---|---|---|
| H | H | H | NHCOCH₃ | (CH₂)₂CN | CH₂CH=CH₂ |
| H | H | H | NHCOnC₃H₇ | (CH₂)₃COOC₂H₅ | (CH₂)₃COOC₂H₅ |
| H | H | OCH₃ | NHCOCH₃ | (CH₂)₂OCH₃ | (CH₂)₂OCH₃ |
| H | H | H | NHSO₂CH₃ | (CH₂)₂OCH₃ | (CH₂)₂OCH₃ |
| H | H | H | CH₃ | [(CH₂)₂O]₃H | [(CH₂)₂O]₃H |
| H | H | H | H | (CH₂)₂OCOC₂H₅ | (CH₂)₂OCOC₂H₅ |
| H | H | H | H | (CH₂)₂OC₆H₅ | (CH₂)₂CN |
| Br | H | H | NHCOCH₃ | (CH₂)₂OCOCH₃ | (CH₂)₂OCOCH₃ |
| Br | H | Cl | NHCOCH₃ | CH₂CH(OH)CH₂OH | H |
| Br | H | Cl | NHCOCH₃ | (CH₂)₃CN | H |
| Br | H | H | NHSO₂C₂H₅ | (CH₂)₂OCH₃ | (CH₂)₂OCH₃ |
| Br | H | H | H | (CH₂)₃COOC₂H₅ | nC₄H₉ |
| Br | H | H | H | (CH₂)₂O(CH₂)₄OCH₃ | (CH₂)₂O(CH₂)₄OCH₃ |
| Cl | H | OCH₃ | NHCOCH₃ | C(CH₃)₂COOC₂H₅ | H |
| Cl | H | H | NHCOC₂H₅ | (CH₂)₄OC₂H₅ | (CH₂)₄OC₂H₅ |
| Cl | H | H | NHCOO(CH₂)₂OCH₃ | (CH₂)₂COOCH₃ | C₂H₅ |
| Cl | H | H | H | (CH₂)₂Cl | (CH₂)₂Cl |
| Br | Br | H | NHCOCH₃ | CH₂CH(OCOCH₃)CH₂OCOCH₃ | C₂H₅ |
| Br | Br | H | NHCOCH₂OCH₃ | CH₂CH(OH)CH₂OC₆H₅ | H |
| Br | Br | H | H | (CH₂)₂CN | (CH₂)₂CN |
| Br | Br | H | H | CH₂C₆H₅ | (CH₂)₂CN |
| Cl | Cl | H | NHCOiC₃H₇ | (CH₂)₂OCH₃ | (CH₂)₂OCH₃ |
| Cl | Cl | H | NHSO₂(CH₂)₂Cl | (CH₂)₂O(CH₂)₃CN | (CH₂)₂O(CH₂)₃CN |
| Cl | Cl | H | NHCOCH₃ | (CH₂)₃C₆H₅ | (CH₂)₂OH |

TABLE 3

[Structure: dinitro-phenol with X³ substituent, azo-linked to aniline with Y, R, NR¹R² substituents]

| X³ | Y | R | R¹ | R² |
|---|---|---|---|---|
| H | Cl | NHSO₂CH₃ | (CH₂)₃COOC₂H₅ | H |
| H | H | NHCOCH₃ | (CH₂)₄OH | (CH₂)₄OH |

TABLE 3-continued

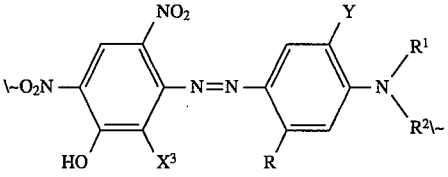

| $X^3$ | Y | R | $R^1$ | $R^2$ |
|---|---|---|---|---|
| H | H | $NHCOCH_3$ | $(CH_2)_2OCOCH_3$ | $(CH_2)_2OCOCH_3$ |
| H | H | H | $(CH_2)_2CN$ | $CH_2CH(OH)CH_2O(CH_2)_2OCH_3$ |
| H | H | $CH_3$ | $(CH_2)_3COOC_2H_5$ | $(CH_2)_3COOC_2H_5$ |
| H | $OCH_3$ | $NHCOCH_3$ | $(CH_2)_2COOC_2H_5$ | $CH_2CH=CH_2$ |
| H | H | $NHCOCH_3$ | $(CH_2)_2OCOO(CH_2)_2C_2H_5$ | $(CH_2)_2OCOO(CH_2)_2OC_2H_5$ |
| Cl | $O(CH_2)_2OCH_3$ | $NHCOCH_3$ | $(CH_2)_2COO(CH_2)_2O(CH_2)_2CN$ | H |
| Br | $OCH_3$ | $NHCOCH_3$ | $(CH_2)_2CN$ | $(CH_2)_2OCOCH_3$ |
| Br | H | $NHCOC_2H_5$ | $(CH_2)_2OCOC_2H_5$ | $(CH_2)_2OCOC_2H_5$ |
| Br | H | $NHCOCH_3$ | $(CH_2)_2OnC_4H_9$ | $(CH_2)_2OnC_4H_9$ |

TABLE 4

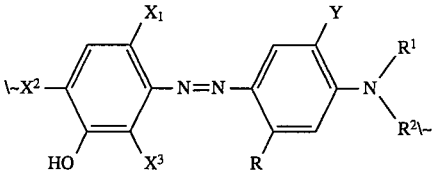

| $X^1$ | $X^2$ | $X^3$ | Y | R | $R^1$ | $R^2$ |
|---|---|---|---|---|---|---|
| Cl | Cl | H | H | $NHCOCH_3$ | $(CH_2)_2OCOOC_2H_5$ | $(CH_2)_2OCOOC_2H_5$ |
| Cl | Cl | H | H | $NHSO_2C_2H_5$ | $(CH_2)_2OC_2H_5$ | $(CH_2)_2OC_2H_5$ |
| Cl | Cl | H | H | $NHCOC_2H_5$ | $(CH_2)_2OCOC_2H_5$ | $(CH_2)_2OCOC_2H_5$ |
| Cl | Cl | H | H | $CH_3$ | $(CH_2)_2CN$ | $[(CH_2)_2O]_2CH_3$ |
| Cl | Cl | H | H | H | $C_2H_5$ | $(CH_2)_3COOC_2H_5$ |
| Br | Br | H | H | $NHCOCH_3$ | $(CH_2)_2CN$ | $CH_2CH=CH_2$ |
| Br | Br | H | H | $NHSO_2nC_4H_9$ | $(CH_2)_3COOCH_3$ | $(CH_2)_3COOCH_3$ |
| Cl | Br | H | H | $NHCOCH_3$ | $(CH_2)_2COOiC_3H_7$ | $(CH_2)_2COOiC_3H_7$ |
| Br | Cl | H | H | $NHCOOCH_3$ | $(CH_2)_2OCOOCH_3$ | $(CH_2)_2OCOOCH_3$ |
| Cl | Cl | Cl | H | H | $(CH_2)_3C_6H_5$ | $(CH_2)_2OH$ |
| Cl | Cl | Cl | H | $NHCOCH_3$ | $CH_2COO(CH_2)_2OCH_3$ | H |
| Br | Cl | Cl | Cl | $NHSO_2CH_3$ | $nC_4H_9$ | H |
| Cl | Br | Cl | H | $CH_3$ | $(CH_2)_3COOC_2H_5$ | $(CH_2)_3COOC_2H_5$ |

I claim:
1. An azo dyestuff of the formula I

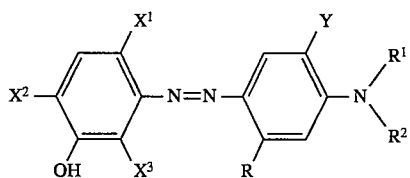

in which $X^1$ and $X^2$ independently of one another are nitro, bromine, chlorine or hydrogen, and wherein at least one of the radicals $X^1$ and $X^2$ is nitro, $X^3$ is hydrogen, chlorine or bromine, R is hydrogen, hydroxyl, chlorine, methyl, methoxy, ethoxy, $(C_1-C_4)$-alkylcarbonylamino, $(C_1-C_4)$-alkylsulphonylamino, $(C_1-C_4)$-alkoxycarbonylamino, $(C_1-C_4)$-alkylcarbonylamino which is substituted by hydroxyl, $(C_1-C_4)$-alkoxy, chlorine, bromine, cyano, phenyl or phenoxy, $(C_1-C_4)$-alkylsulphonylamino or $(C_1-C_4)$-alkoxycarbonylamino which are substituted by hydroxyl, $(C_1-C_4)$-alkoxy, chlorine, bromine or cyano, Y is hydrogen, chlorine, methoxy, ethoxy, methoxyethoxy or ethoxyethoxy and $R^1$ and $R^2$ independently of one another are $(C_1-C_4)$-alkyl; $(C_1-C_4)$-alkyl which is substituted by hydroxyl, $(C_1-C_4)$-alkoxy, alkoxyalkoxy having a total of up to 6 C atoms, hydroxyalkoxy having up to 4 C atoms, hydroxyalkoxyalkoxy having up to 6 C atoms, cyanoalkoxy having 2 to 5 C atoms, cyanoalkoxy having 2 to 5 C atoms, $(C_1-C_4)$-alkylcarbonyloxy, $(C_1-C_4)$-alkoxycarbonyloxy, $(C_1-C_4)$-alkoxycarbonyl or $(C_1-C_4)$-alkylcarbonyloxy, $(C_1-C_4)$-alkoxycarbonyloxy or $(C_1-C_4)$-alkoxycarbonyl which are substituted by hydroxyl, chlorine, bromine, cyano or $(C_1-C_4)$-alkoxy, or allyl or hydrogen, or one of the radicals $R^1$ or $R^2$ furthermore is phen-$(C_0-C_3)$-alkyl, phenoxyethyl or cyclohexyl.

2. The azo dyestuff according to claim 1, wherein $X^2$ is nitro.

3. The azo dyestuff according to claim 1, wherein $X^3$ is hydrogen.

4. The azo dyestuff according to claim 1, wherein $X^2$ is nitro, $X^3$ is hydrogen.

5. The azo dyestuffs according to claim 3, wherein $X^1$ is nitro and $X^2$ is chlorine or bromine.

6. The azo dyestuff according to claim 5, wherein $X^2$ is bromine.

7. The azo dyestuff according to claim 3, wherein $X^1$ is hydrogen and $X^2$ is nitro.

8. The azo dyestuff according to claim 1, wherein Y is hydrogen.

9. The azo dyestuff according to claim 6, wherein Y is hydrogen.

10. The azo dyestuff according to claim 7, wherein Y is hydrogen.

11. The azo dyestuff according to claim 1, wherein R is optionally substituted $(C_1-C_4)$-alkylcarbonylamino, -alkylsulphonylamino or -alkoxycarbonylamino.

12. The azo dyestuff according to claim 1, wherein at least one of the radicals $R^1$ and $R^2$ represent a substituted ethyl.

13. The azo dyestuff according to claim 9, wherein at least one of the radicals $R^1$ and $R^2$ represent a substituted ethyl.

14. The azo dyestuff according to claim 10, wherein at least one of the radicals $R^1$ and $R^2$ represent a substituted ethyl.

15. A dyestuff mixture, comprising one or more azo dyestuffs of the formula I

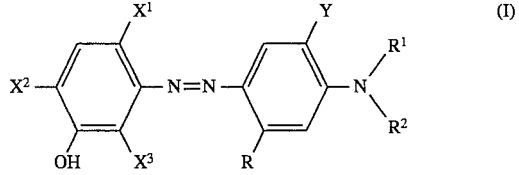

in which $X^1$ and $X^2$ independently of one another are nitro, bromine, chlorine or hydrogen, $X^3$ is hydrogen, chlorine or bromine, R is hydrogen, hydroxyl, chlorine, methyl, methoxy, ethoxy, $(C_1-C_4)$-alkylcarbonylamino, $(C_1-C_4)$-alkylsulphonylamino, $(C_1-C_4)$-alkoxycarbonylamino, $(C_1-C_4)$-alkylcarbonylamino which is substituted by hydroxyl, $(C_1-C_4)$-alkoxy, chlorine, bromine, cyano, phenyl or phenoxy, $(C_1-C_4)$-alkylsulphonylamino or $(C_1-C_4)$-alkoxycarbonylamino which are substituted by hydroxyl, $(C_1-C_4)$-alkoxy, chlorine, bromine or cyano, Y is hydrogen, chlorine, methoxy, ethoxy, methoxyethoxy or ethoxyethoxy and $R^1$ and $R^2$ independently of one another are $(C_1-C_4)$-alkyl; $(C_1-C_4)$-alkyl which is substituted by hydroxyl, $(C_1-C_4)$-alkoxy, alkoxyalkoxy having a total of up to 6 C atoms, hydroxyalkoxy having up to 4 C atoms, hydroxyalkoxyalkoxy having up to 6 C atoms, cyanoalkoxy having 2 to 5 C atoms, $(C_1-C_4)$-alkylcarbonyloxy, $(C_1-C_4)$-alkoxycarbonyloxy, $(C_1-C_4)$-alkoxycarbonyl or $(C_1-C_4)$-alkylcarbonyloxy, $(C_1-C_4)$-alkoxycarbonyloxy or $(C_1-C_4)$-alkoxycarbonyl which are substituted by hydroxyl, chlorine, bromine, cyano or $(C_1-C_4)$-alkoxy, or allyl or hydrogen, or one of the radicals $R^1$ or $R^2$ furthermore is phen-$(C_0-C_3)$-alkyl, phenoxyethyl or cyclohexyl.

16. The mixture as claimed in claim 15, wherein $X^3$ and Y are hydrogen.

17. The mixture as claimed in claim 16, wherein at least one of the radicals $R^1$ and $R^2$ represents a substituted ethyl.

18. Process for the preparation of azo dye of the formula I,

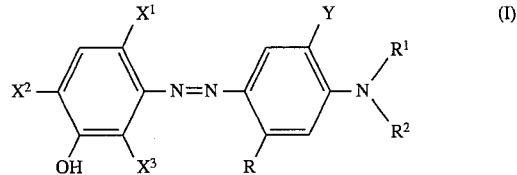

in which $X^1$ and $X^2$ independently of one another are nitro, bromine, chlorine or hydrogen, and at least one of the radicals $X^1$ and $X^2$ is nitro, $X^3$ is hydrogen, chlorine or bromine, R is hydrogen, hydroxyl, chlorine, methyl, methoxy, ethoxy, $(C_1-C_4)$-alkylcarbonylamino, $(C_1-C_4)$-alkylsulphonylamino, $(C_1-C_4)$-alkoxycarbonylamino, $(C_1-C_4)$-alkylcarbonylamino which is substituted by hydroxyl, $(C_1-C_4)$-alkoxy, chlorine, bromine, cyano, phenyl or phenoxy, $(C_1-C_4)$-alkylsulphonylamino or $(C_1-C_4)$-alkoxycarbonylamino which are substituted by hydroxyl, $(C_1-C_4)$-alkoxy, chlorine, bromine or cyano, Y is hydrogen, chlorine, methoxy, ethoxy, methoxyethoxy or ethoxyethoxy and $R^1$ and $R^2$ independently of one another are $(C_1-C_4)$-alkyl; $(C_1-C_4)$-alkyl which is substituted by hydroxyl, $(C_1-C_4)$-alkoxy, alkoxyalkoxy having a total of up to 6 C atoms, hydroxyalkoxy having up to 4 C atoms, hydroxyalkoxyalkoxy having up to 6 C atoms, cyanoalkoxy having 2 to 5 C atoms, cyanoalkoxy having 2 to 5 C atoms, $(C_1-C_4)$-alkylcarbonyloxy, $(C_1-C_4)$-alkoxycarbonyloxy, $(C_1-C_4)$-alkoxycarbonyl or $(C_1-C_4)$-alkylcarbonyloxy, $(C_1-C_4)$-alkoxycarbonyloxy or $(C_1-C_4)$-alkoxycarbonyl which are substituted by hydroxyl, chlorine, bromine, cyano or $(C_1-C_4)$-alkoxy, or allyl or hydrogen, or one of the radicals $R^1$ or $R^2$ furthermore is phen-$(C_0-C_3)$-alkyl, phenoxyethyl or cyclohexyl, comprising diazotizing an amine of the formula II

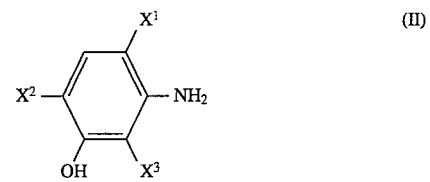

and coupling the diazotization product to a coupling component of the formula III

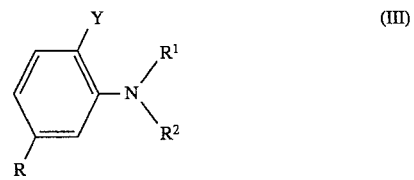

wherein $X^1$, $X^2$, $X^3$, Y, R, $R^1$ and $R^2$ have the meanings given above.

19. A process for dyeing and printing hydrophobic fiber materials and mixtures of these materials with naturally occurring fiber materials comprising applying to said fiber materials with a dyestuff according to claim 1.

* * * * *